Figure 1:
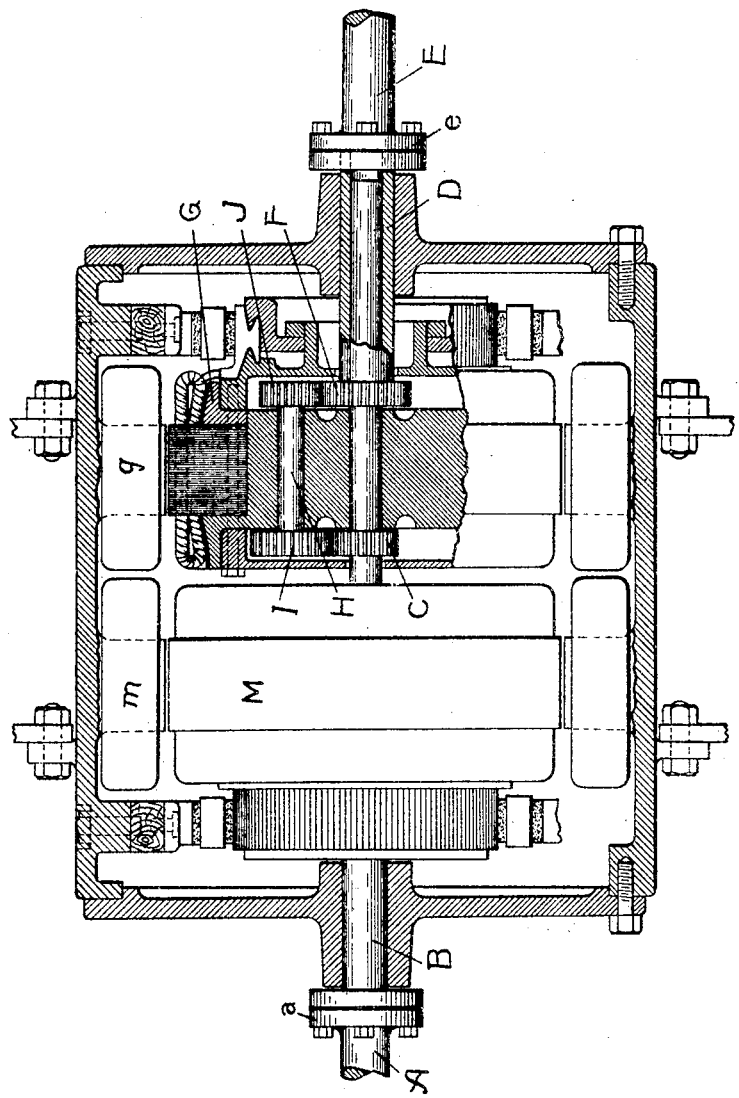

No. 808,220. PATENTED DEC. 26, 1905.
C. G. SIMONDS.
POWER TRANSMISSION MECHANISM FOR AUTOMOBILES.
APPLICATION FILED JUNE 22, 1904.

2 SHEETS—SHEET 1.

WITNESSES: INVENTOR:
Charles G. Simonds,
by Albert H. Daw
Atty.

No. 808,220. PATENTED DEC. 26, 1905.
C. G. SIMONDS.
POWER TRANSMISSION MECHANISM FOR AUTOMOBILES.
APPLICATION FILED JUNE 22, 1904.
2 SHEETS—SHEET 2.
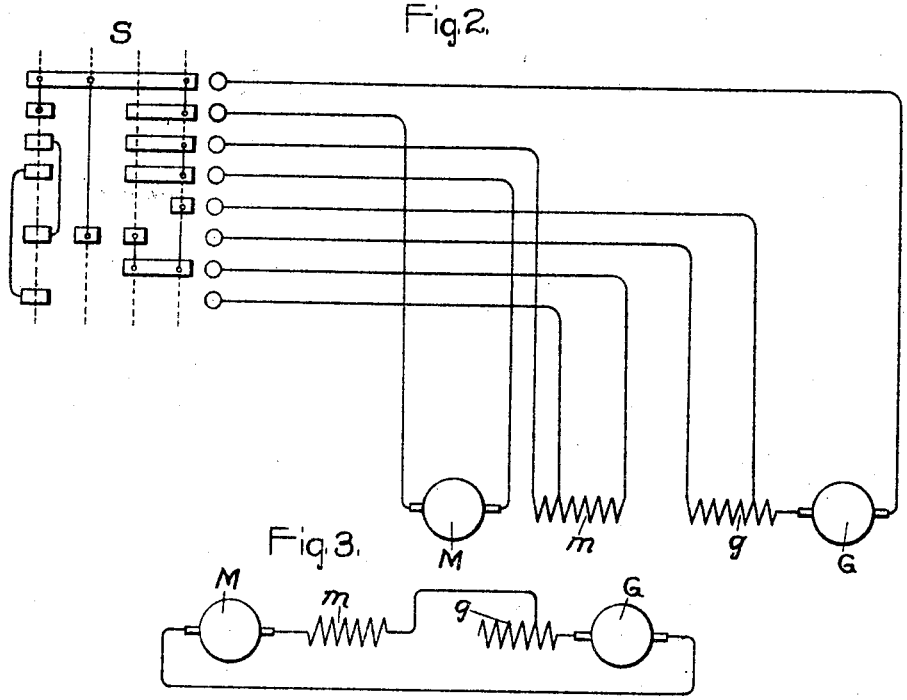
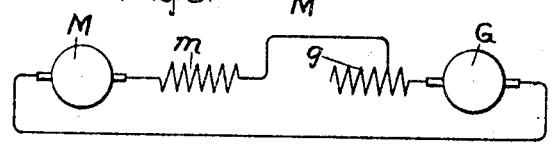
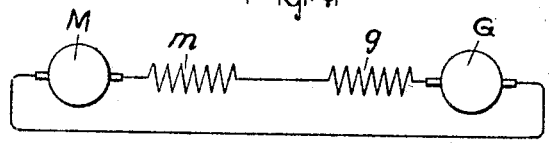
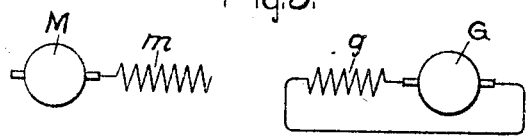
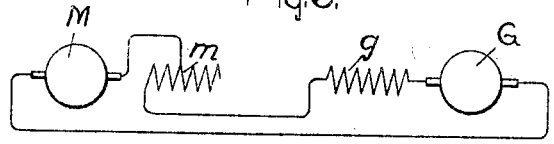
WITNESSES:
INVENTOR:
Charles G. Simonds.
by Albert G. Davis
Att'y.

UNITED STATES PATENT OFFICE.

CHARLES G. SIMONDS, OF SCHENECTADY, NEW YORK, ASSIGNOR TO GENERAL ELECTRIC COMPANY, A CORPORATION OF NEW YORK.

POWER-TRANSMISSION MECHANISM FOR AUTOMOBILES.

No. 808,520. Specification of Letters Patent. Patented Dec. 26, 1905.

Application filed June 22, 1904. Serial No. 213,642.

*To all whom it may concern:*

Be it known that I, CHARLES G. SIMONDS, a citizen of the United States, residing at Schenectady, county of Schenectady, State of New York, have invented certain new and useful Improvements in Power-Transmission Mechanism for Automobiles, of which the following is a specification.

My invention relates to power-transmitting mechanisms, and is particularly applicable to automobiles.

My invention has particular reference to transmission mechanisms of the type described in Patent No. 723,168, issued to H. Lemp, March 17, 1903. In this patent is described a transmission mechanism in which a prime mover is connected to one member of a differential gear, the load is connected to the second member, and the third member is connected to a dynamo-electric machine. By varying the field strength of this dynamo-electric machine the speed and torque of the prime mover may be varied. Instead of wasting in resistances the energy generated by the dynamo-electric machine a second dynamo-electric machine is provided to receive this energy and to transform it into useful work which is applied in helping to move the load.

The object of my invention is to provide a transmission mechanism operating on the principle described in the above patent, but with the parts rearranged and reconstructed so as to produce a more compact and efficient mechanism.

My invention will best be understood by reference to the accompanying drawings, in which—

Figure 1 shows a transmission mechanism constructed in accordance with my invention. Fig. 2 shows diagrammatically a controlling-switch adapted to the control of the same; and Figs. 3 to 6 show the circuit connections produced by the controlling-switch of Fig. 2.

In Fig. 1, A represents the shaft of the prime mover, which is connected by the coupling *a* to the shaft B, which carries armature M of a dynamo-electric machine and the pinion C. Journaled upon the shaft B is the sleeve D, which is connected by the coupling *e* to the driven shaft E. Sleeve D also carries the gear F.

G represents the armature of the second dynamo-electric machine, which is journaled upon shaft B and which carries one or more short shafts H, journaled in the armature-body, each provided with two pinions I and J meshing with gears C and F, respectively.

*m* and *g* represent the stationary fields for the two dynamo-electric machines.

The operation is as follows: If the engine-shaft A is rotated while the circuits of the dynamo-electric machines are open, the driven shaft E will remain stationary and the armature G will rotate freely at a speed depending upon the ratio of the gears, the gears I and J running as planetary gears. Now if the circuit of generator G is closed a current will be generated which will produce a torque opposing the rotation of the armature and impressing a torque upon the gear F connected to the load. By varying the strength of this current the torque and speed of generator G may be varied, thereby varying the speed and torque of the load. Instead of wasting the energy generated by the machine G the current may be supplied to the motor M, which, if properly connected, will assist in driving shaft B so as to increase the torque delivered to the load.

Fig. 2 shows a controlling-switch adapted to produce the above-mentioned circuit changes, and Figs. 3 to 6 show the circuit connections produced by controlling-switch S in its several positions. In the first position the circuit of generator G is closed through the motor M. In this position the generator G has a weak field, so as to produce an electromotive force only a little greater than the counter electromotive force of the motor M. The flow of current is consequently restricted and the mechanism may be started without a jar. In the second position of the switch the generator G has full field, and consequently the speed of generator G is diminished and the torque impressed upon the load is increased. In starting a heavy load—as, for instance, in the case of an automobile upon a grade—the controlling-switch would be moved at once to position 2. The load speed in this position will depend both upon the relative designs of the two machines and the gear ratio. In position 3 the motor M is cut out of circuit and the generator G is short-circuited. The generator G consequently acts as a clutch. The armature is held nearly stationary, slipping only the necessary amount to produce the current required for the torque. Instead of passing directly from the connections of Fig. 4 to those of Fig. 5 the generator may be short-circuited gradually by gradually cutting out the field of motor M, if desired. In order to obtain a higher speed, switch S may be moved to position 4, producing the circuit connections shown in Fig. 6. The motor M is again included in circuit with a weak field and with its field reversed. This machine consequently becomes a generator absorbing a portion of the torque delivered by the engine and supplying energy to the machine G, which now runs as a motor, so as to increase the speed of the load.

The circuit connections and the variations therein which I have described may be varied as desired, since the specific arrangement of the controlling-switch forms no part of my invention.

The construction of the dynamo-electric machines may also be varied as desired without departing from the spirit of my invention, and I aim in the appended claims to cover all such modifications.

What I claim as new, and desire to secure by Letters Patent of the United States, is—

1. In a power-transmission mechanism, a driving-shaft, a gear carried thereby, a driven shaft, a gear carried thereby, a dynamo-electric machine, a shaft carried thereby, two gears carried by said shaft and engaging the first two gears respectively, and a second dynamo-electric machine connected in circuit with the first.

2. In a power-transmission mechanism, a driving-shaft, a gear carried thereby, a driven shaft, a gear carried thereby, a dynamo-electric machine, a shaft carried thereby, two gears carried by said shaft and engaging the first two gears respectively, a second dynamo-electric machine connected in circuit with the first, and means for varying the relative field strengths of said machines.

3. In a power-transmission mechanism, a driving-shaft, a gear carried thereby, a driven shaft, a gear carried thereby, a dynamo-electric machine, a shaft carried thereby, two gears carried by said shaft and engaging the first two gears respectively, and a second dynamo-electric machine connected in circuit with the first and mechanically connected to assist in driving the load.

4. In a power-transmission mechanism, a driving-shaft, a gear carried thereby, a driven shaft, a gear carried thereby, a dynamo-electric machine, a shaft carried thereby, two gears carried by said shaft and engaging the first two gears respectively, a second dynamo-electric machine connected in circuit with the first and mechanically connected to assist in driving the load, and means for varying the relative field strengths of said machines.

5. In a power-transmission mechanism, a driving-shaft, a driven shaft, two rigidly-connected planetary gears connecting said shafts, and a dynamo-electric machine driven by said planetary gears.

6. In a power-transmission mechanism, a driving-shaft, a driven shaft, two rigidly-connected planetary gears connecting said shafts, a dynamo-electric machine driven by said planetary gears, and a second dynamo-electric machine in circuit with the first and mechanically connected to add its torque to the load.

7. In a power-transmission mechanism, a driving-shaft, a driven shaft, two rigidly-connected planetary gears connecting said shafts, a dynamo-electric machine driven by said planetary gears, and means for varying the speed and torque of said machine.

8. In a power-transmission mechanism, a driving-shaft, a driven shaft, two rigidly-connected planetary gears connecting said shafts, a dynamo-electric machine driven by said planetary gears, a second dynamo-electric machine in circuit with the first and mechanically connected to add its torque to the load, and means for varying the relative field strengths of said machines.

9. In a power-transmission mechanism, a dynamo-electric machine, two rigidly-connected gears rotatably mounted on the armature thereof, a driving-pinion engaging one of said gears, a driven pinion engaging the other gear, and means for varying the speed and torque of said machine.

10. In a power-transmission mechanism, a dynamo-electric machine, two rigidly-connected gears rotatably mounted on the armature thereof, a driving-pinion engaging one of said gears, a driven pinion engaging the other gear, a second dynamo-electric machine in circuit with the first and mechanically connected to assist in driving the load, and means for varying the relative field strengths of said machines.

In witness whereof I have hereunto set my hand this 21st day of June, 1904.

CHARLES G. SIMONDS.

Witnesses:
    BENJAMIN B. HULL,
    HELEN ORFORD.